(12) United States Patent
Fliegl, Sr.

(10) Patent No.: US 9,957,004 B2
(45) Date of Patent: May 1, 2018

(54) CARGO BAY CONSTRUCTION WITH A SLIDEABLE WALL AND VEHICLE WITH SUCH A CARGO BAY CONSTRUCTION

(71) Applicant: Josef Fliegl, Sr., Kastl (DE)

(72) Inventor: Josef Fliegl, Sr., Kastl (DE)

( * ) Notice: Subject to any disclaimer, the term of this patent is extended or adjusted under 35 U.S.C. 154(b) by 0 days. days.

(21) Appl. No.: 14/695,153

(22) Filed: Apr. 24, 2015

(65) Prior Publication Data

US 2015/0329159 A1 Nov. 19, 2015

(30) Foreign Application Priority Data

May 16, 2014 (DE) .................. 20 2014 102 305 U

(51) Int. Cl.
*B62D 63/06* (2006.01)
*B62D 63/08* (2006.01)
*B60R 5/04* (2006.01)
*B60P 1/00* (2006.01)

(52) U.S. Cl.
CPC ............ *B62D 63/061* (2013.01); *B60P 1/006* (2013.01); *B60R 5/04* (2013.01); *B62D 63/08* (2013.01)

(58) Field of Classification Search
CPC ................ B60P 1/365; B60P 1/52; B65F 3/28
USPC ........................................................ 414/513
See application file for complete search history.

(56) References Cited

U.S. PATENT DOCUMENTS

| 2,298,982 | A | | 10/1942 | Smith | |
|---|---|---|---|---|---|
| 3,578,186 | A | * | 5/1971 | Thomas | ............ B60P 1/36 414/510 |
| 8,647,044 | B2 | * | 2/2014 | Stewart | ............ B60P 1/365 414/510 |

FOREIGN PATENT DOCUMENTS

| DE | 20 2004 009 744 U1 | 9/2004 |
|---|---|---|
| DE | 601 02 731 T2 | 3/2005 |
| EP | 1364828 A2 | 11/2003 |
| EP | 2 497 684 A1 | 9/2012 |
| JP | S5938762 | 9/1984 |
| JP | S6060332 | 4/1985 |

* cited by examiner

*Primary Examiner* — Saul Rodriguez
*Assistant Examiner* — Willie Berry, Jr.
(74) *Attorney, Agent, or Firm* — Renner Kenner Greive Bobak Taylor & Weber

(57) ABSTRACT

A cargo bay construction includes a floor and a wall that is slideable along the floor, whereby, below the wall facing surfaces of the floor, a drive slide is arranged and is connected with the wall that is slideable along the floor over a developed guide opening in the floor, characterized in that the guide opening is covered by an elastic deformable cover overlying the floor, whereby the cover in the area of the drive slide is lifted from the floor under elastic deformation.

13 Claims, 7 Drawing Sheets

CARGO BAY CONSTRUCTION WITH A SLIDEABLE WALL AND VEHICLE WITH SUCH A CARGO BAY CONSTRUCTION

CROSS-REFERENCE TO RELATED APPLICATIONS

This application claims priority from German Application No. 20 2014 102 305.4, filed May 16, 2014, the disclosure of which is incorporated herein by reference.

FIELD OF INVENTION

The invention concerns a cargo bay construction with a slideable wall, and a vehicle with this type of cargo bay construction.

BACKGROUND OF THE INVENTION

The sliding of the wall in this type of cargo bay construction serves the purpose of making the limited cargo bay to the side of the wall temporarily smaller in order to either unload the cargo stored in the cargo bay over an unloading opening located opposite a normally slideable wall or in order to compress the load in the completely closed cargo bay.

A trailer with an appropriate cargo bay construction is known from the DE 20 2004 009 744 U1. There, the cargo bay, which opens from the top, is distinguished from a cargo bay floor, a moveable front wall, a back wall that is opened by being folded up as well as from the two side walls. The cargo bay floor includes an integrated main floor that is unmovable in the cargo bay construction as well as by a sliding floor, whose length (in the direction of the relocatable front wall) is almost half of the largest distance between the relocateable front wall and the back wall and which is relocatable by means of a drive in the form of a hydraulic cylinder. The relocation of the front wall relative to the back wall, or rather relative to the unloading opening cleared by the back wall, takes place by relocating the sliding floor with the front wall on the main floor and/or by relocating the front wall on the sliding floor, whereby for a furthest possible slide of the front wall in the direction of the unloading opening, both the sliding floor on the main floor as well as the front wall on the sliding floor must be slid.

For the sliding of the front wall on the sliding floor, a moveable driver is planned on the side turned away from the cargo bay, which is connected with the front wall. This cooperates with a drive mechanism in the form of a chain that runs in the developed channel from the sliding floor to the side of the sliding floor turned away from the cargo bay along direction of movement of the front wall. The channel capturing the chain is designed with an opening running along its longitudinal direction, through the chain of the respective section, which in connection with the relative position of the front wall on the sliding floor is lead over multiple diverting gears, and is lead out of the channel.

A belt serves to cover up the opening of the channel in order to avoid an intrusion of the stored cargo in the cargo bay. For this, the belt lies in respective sections of the channel, whereby the chain is lead inside of the channel, onto this and closes the opening correspondingly. In the area of the drive by contrast, in which the chain from the channel is lead out, the belt is lifted over a pulley arrangement from the channel and over the diverting gears of the drive. In order to ensure a secure support of the unstable belt on the channel, a tension guide is designed for the belt.

The sealing of the opening of the channel by means of a belt shows a series of disadvantages. On the one hand, a cost effective producible belt is relatively susceptible to wear so that this needs to be relatively frequently changed out in connection with the impacting cargo in the cargo bay on the belt. This increases the maintenance costs for the vehicle. In addition to this, the construction costs for this type of covering of the opening of the channel are also relatively high, which can be traced back to the necessary tension guide for the belt.

Originating from this state of the technology, the invention therefore particularly has the underlying task of improving the construction costs and/or the maintenance costs of the cargo bay construction known from DE 20 2004 009 744 U1.

SUMMARY OF THE INVENTION

This task is solved by means of a cargo bay construction and a vehicle including an inventive cargo bay construction. The advantageous designs of the inventive cargo bay construction and the inventive vehicle are both the subject of the claims and come about in the following description of the invention.

The underlying thought of the invention is to replace the belt, which is susceptible to wear and is consequentially unstable and requires a tension guide, with a stable but elastic deformable cover that does not require a tension guide and still provides a secure cover of the channel opening through the elastic deformability However in addition to this, a local lift from the floor of the cargo bay construction is made possible.

The cargo bay construction genre—which includes at least a floor and a wall that is slideable along the floor, and below the wall facing surfaces of the floor a drive slide is arranged and connected with the wall that is slideable along the floor over a developed guide opening in the floor—is improved by the present invention by covering the guide opening with an elastic deformable covering overlying the floor, whereby the covering in the area of the drive slide is lifted from the floor under elastic deformation.

The cargo, which is enclosed in the cargo bay construction, is limited preferably by the slideable wall and additional walls. It is especially preferred that a complete limitation is designed through walls, whereby it is additionally preferred that at least one of the walls, in particular those that are opposite the slideable wall, can be opened in order to free up an unloading opening. Preferably the slideable wall is the front wall or (particularly preferred) the back wall of the cargo bay construction. There is also however the fundamental possibility of developing at least one of the sidewalls to be a slideable wall.

An inventive vehicle encompasses at least a carriage, in particular a wheel based carriage and an arranged inventive cargo bay construction on the carriage. With regards to the vehicle, this in particular can deal with a trailer. A design in the form of a motor vehicle is however even possible.

An appropriate cover for an inventive cargo bay construction can be cheaply developed from sheet metal, particularly sheet steel. Such a cover is characterized also through a relatively good resistance to wear.

The local lift of the cover from the floor can be realized in a constructive easy way through a contact with the drive slide. In order to reduce rubbing in the process, the drive slide can exhibit one or multiple roles that are located in the lifting of the relevant contact with the cover.

In order to avoid the cover being lifted from the floor within the cargo bay that is limited from one side of the front wall, it can be that in additional preferred designs of the inventive cargo bay construction, that the drive slide is arranged outside of the floor surface of the cargo bay. A local lift of the cover from the floor of the cargo bay always takes place outside of the cargo bay, whose size as a consequence of sliding of the slideable wall, can be changed.

The sliding of the wall can preferably be designed so that the drive slide moves by means of a drive mechanism and is consequently integrated into this. For this, a drive mechanism can be designed with a closed revolving mechanism whereby the drive slides are solidly connected with a section of the mechanism. It is however preferably designed so that the mechanism is open and thus developed with two ends, whereby the drive slides are connected with both ends of the mechanism. This design in particular can make a constructive advantageous integration of a tension guide for the mechanism possible, which is arranged between the drive slides and at least one of the mechanisms. Such a tension guide can be especially advantageously developed as a simple spring element or even a coil spring that is preloaded and supported between the corresponding end of the mechanism and the drive mechanism.

Depending on the selection of the material for the cover, the scope within which this is elastic and deformable, can be limited. It is therefore preferably designed in the inventive cargo bay construction that the drive mechanism encompasses a statically integrated mobile drive motor into the cargo bay construction and consequently not into the front wall that for instance can be developed electrically, hydraulically or pneumatically. This can be avoided (differently from the DE 20 2004 009 744 U1 known cargo bay construction) by the cover being led over at least a relatively large drive wheel, and therefore having to be raised correspondingly far from the floor. Additionally, the static integration of the drive motor still exhibits the advantage that the mass of the slideable wall, and with it the driving power required for sliding the wall, is kept low. And eventually it is no longer necessary to have supply lines that are supplied with energy from the drive motor, so to develop this so that the mobility of the drive motor with the front wall is allowed. Through this the construction costs for the cargo bay construction are kept low.

In an additionally preferred design of the inventive cargo bay construction it can be designed so that the drive mechanism exhibits a chain section cooperatively with the drive motor as well as a cable section. The design of the mechanism is made possible by this so that in the corresponding design of the drive mechanism in the back and forth sliding of the mechanism, no complete rotation of the mechanism is required, so that the development of the mechanism as with the drive motor cooperating chain on this section can be restricted, that also is led in the possible movement of the slideable wall over the driver motor and in particular a drive sprocket of the drive motor. The other sections of the mechanism can by contrast be led out as a simple cable, that can represent a cost effective construction, that can moreover be distinguished through a low weight and where applicable also have a reduced operation noise.

With such a design of the drive mechanism it can also be designed so that the chain section is led over diverting gears that are serving as a drive pinion and the cable section is led over a diverting roller, in order to develop, where applicable, through the integration of the drive slide, a closed rotation of the mechanism.

In an additional preferred design of the inventive cargo bay construction, it can still be designed so that the drive slide is arranged within one of the developed channels spanning the floor (and thereby developed as a drop from a main surface of the floor). Particularly preferred in this channel; the drive mechanism can also be partially or totally arranged. Through this, the need to preserve a large construction space for the drive of the slideable wall below the floor can be avoided. The channel spanning the cargo bay is decreased in this process as is the storage volume of the storage space, which however takes place in an merely comparatively low scope and therefore can be seen as negligible.

On the other hand, through the channel spanning the cargo bay, an additional guide function for the sliding movement of the wall can be realized, which can be designed so that the channel intervenes in an open slot opening of the front wall on one side.

In an additional preferred design of the inventive cargo bay construction, it can moreover be designed so that the front wall rolls off on the cover by means of a roller that is arranged in the direction of movement space from the drive slide. By means of this roller, the rubbing connected with the sliding movements can be fundamentally minimized. Therefore it can moreover be achieved, so that this rolls off onto the cover, that a lift of the cover remains locally limited and therefore ends at the latest on the roller. Therefore it can be particularly ensured that the cover in the area of the cargo bay on the floor is supported and consequentially a penetration of cargo in the guide opening is disabled. It is therefore a preferable design so that such a roller is arranged at least between the drive slide and the cargo bay. At least two such rollers are especially preferred in the design, of which at least one is arranged on both sides of the drive slide (with regard to direction defined through the ability of the wall to be slid).

The invention is hereinafter more precisely explained by means of a represented design example in the drawings. In the drawings it is shown:

DETAILED DESCRIPTION OF ILLUSTRATIVE EMBODIMENTS

Figure 1:
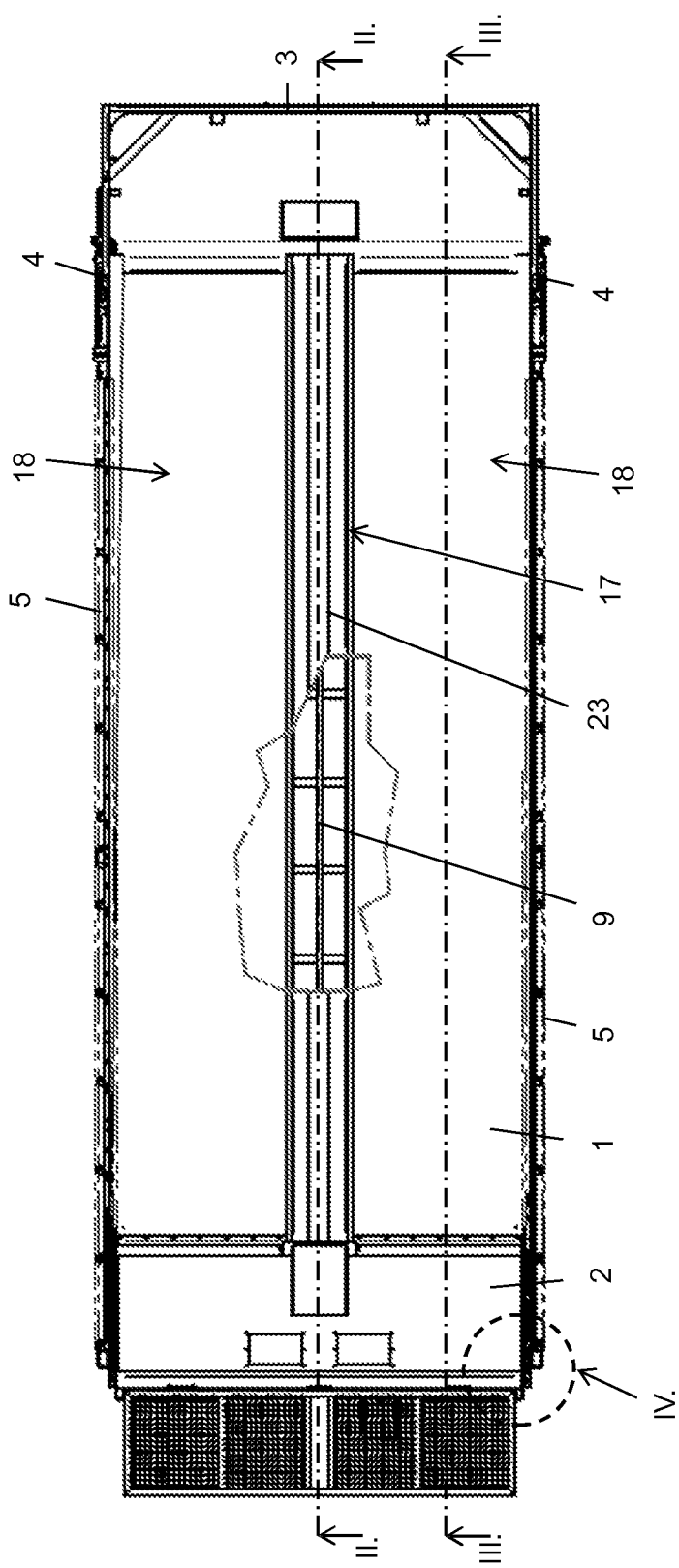
FIG. 1: an inventive cargo bay construction in overview.

The cargo bay construction represented in the drawings encompasses a floor 1, as well as the adjacent walls at the end of the floor 1, that limit the upwardly open cargo bay. It is seen in a longitudinal direction of the cargo bay construction, that an anterior front wall 2 is moved by being slid, while a back wall 3 is moved upwardly on hinges of the swivel joints 4, in order to provide unloading openings. Additionally, two fixed walls 5 are still designed.

Figure 2:
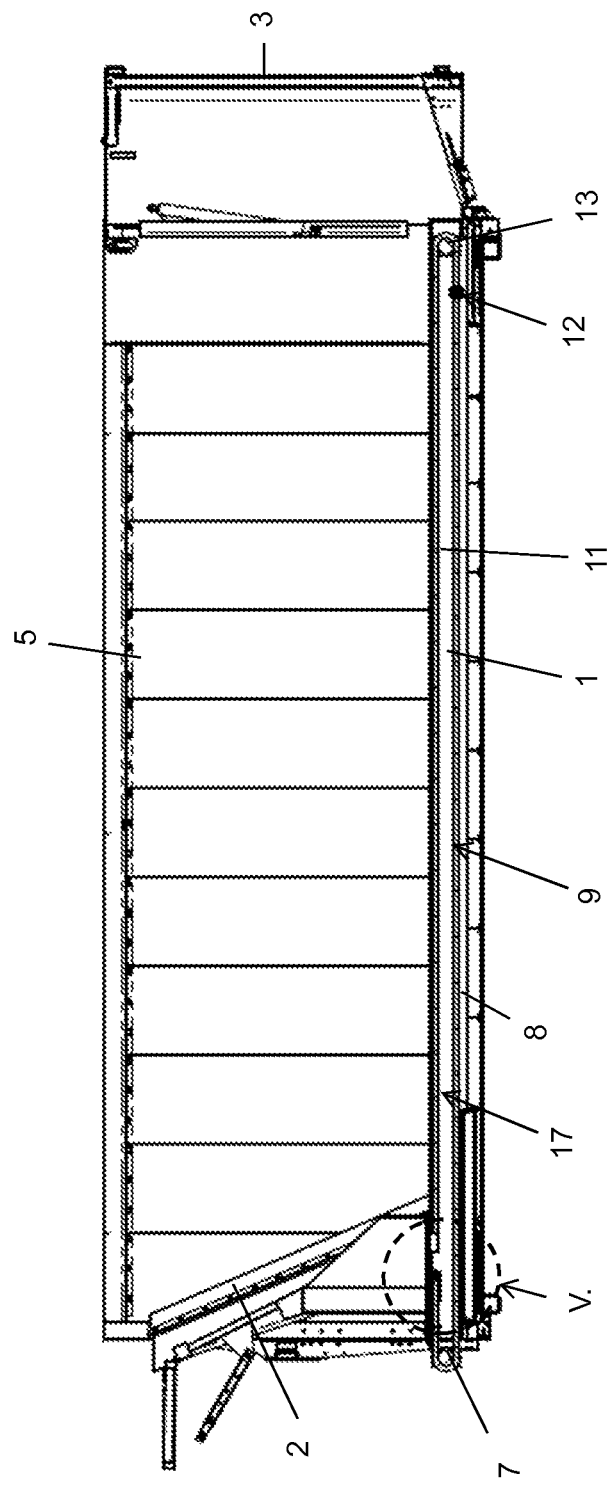
FIG. 2: a long section through the cargo bay construction along the cut plane II-II in FIG. 1.
Figure 3:
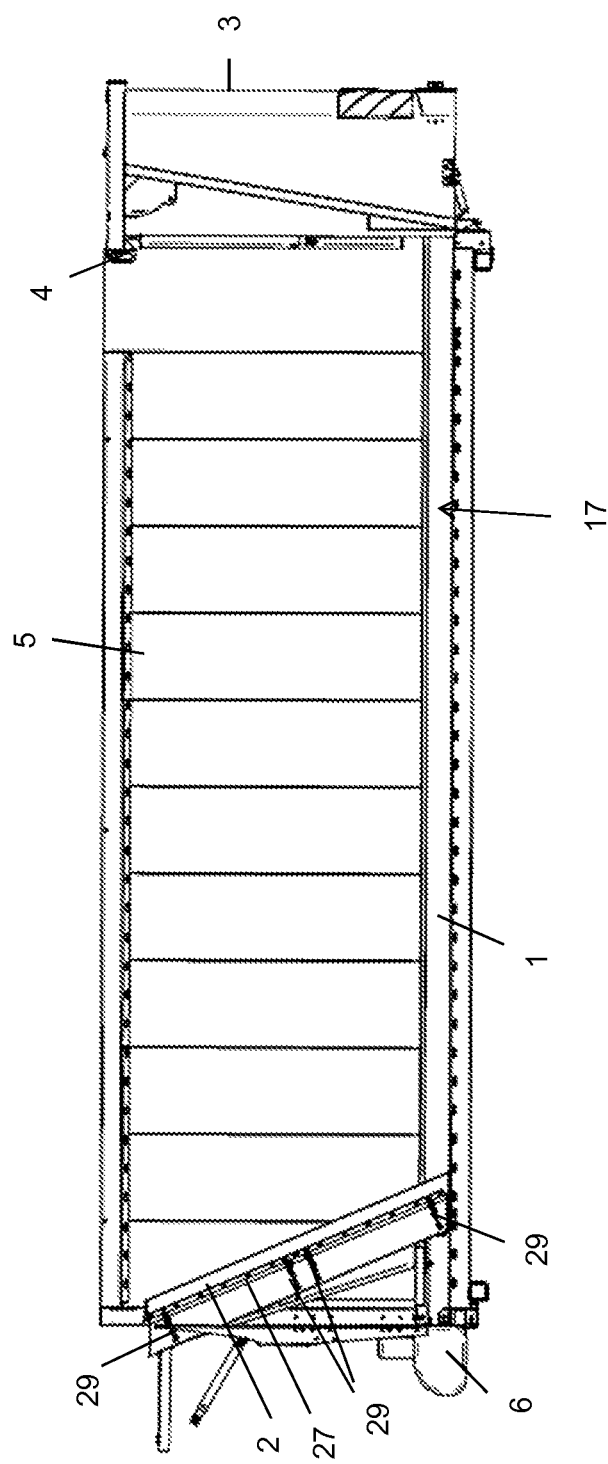
FIG. 3: a long cut through the cargo bay construction along the cut plane III-III in FIG. 1.

The front wall 2 is moved by being slid on the floor 1 along the longitudinal direction of the cargo bay construction, whereby the volume of the cargo bay can be changed. This can then be used to unload a stored load in the cargo bay from the opened back wall 3 over the unloading opening, which in comparison to tip troughs, can take place relatively constantly. The load can be sealed through the sliding of the front wall 2, which can be particularly designed for the closed back wall 3. FIGS. 1 to 3 show the front wall 2 in a position that it is as far away from the back wall 3 as possible. In this position, this limits the maximal cargo bay of the cargo bay construction In order to slide the front wall 2, a drive has been designed. This encompasses, for instance, a hydraulically functioning drive motor 6 arranged on the front end of the cargo bay construction, whose pinion shaft carries a drive pinion that cooperates with a chain section 8 of the drive mechanism 9. The gears of the drive pinion engage the chain, and consequently a positive locking connection is developed, through which the driving power from the drive motor 6 can be carried over to drive mechanism 9. The drive pinion simultaneously serves as a diverting gear for the drive mechanism 9.

Figure 5:
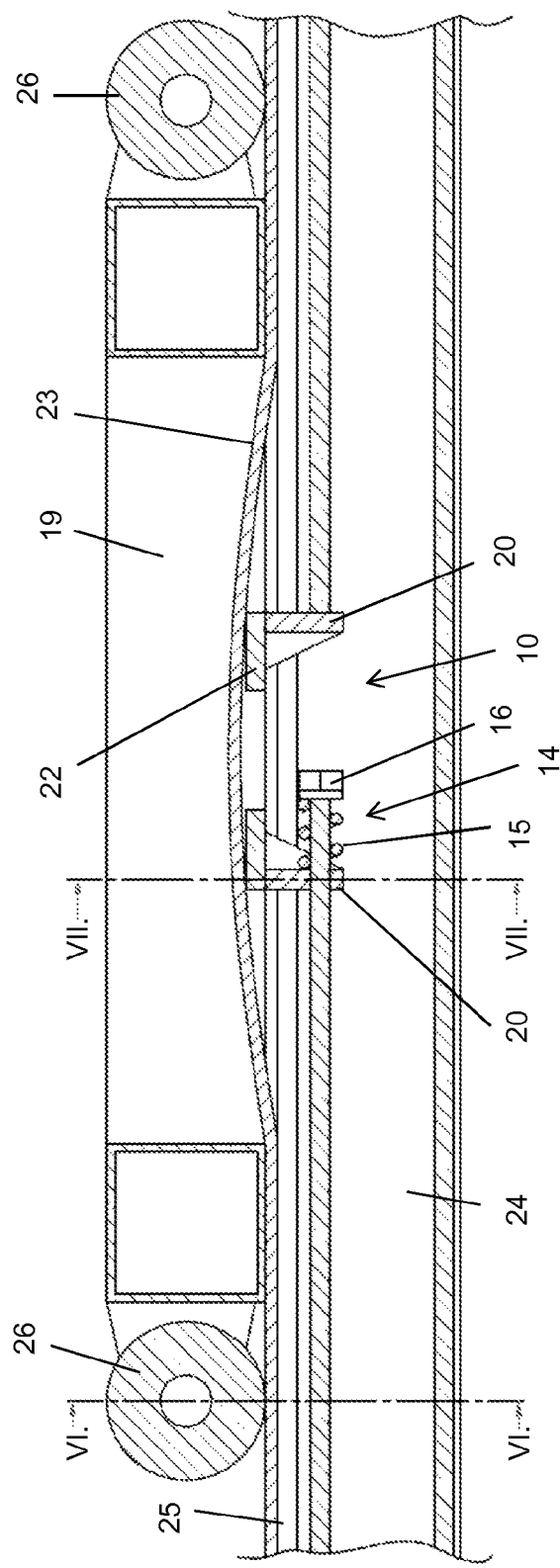
FIG. 5: the section indicated in FIG. 2 by V in the enlarged representation.

Drive mechanism 9 is open and is therefore not developed to be closed circumferentially. According to this, these two ends are exhibited that are respectively clamped to a drive slide 10 (compare FIG. 5). As a results of this, a first end developed from chain section 8 of drive mechanism 9 is connected with an end (referring to the longitudinal direction of the cargo bay construction) of drive slide 10 and the second end of the drive mechanism 9 is connected with the corresponding other end (referring to the longitudinal direction of the cargo bay construction) of drive slide 10. This second end of the drive mechanism 9 is developed by a cable section 11, that is sturdily connected with the chain section 8 to a connection point 12 and that is led over the arranged diverting roller 13 of the mechanism in the area of the back wall 3. In FIGS. 1 to 3 the indicated position of the front wall 2 is the connection point 12 and is positioned close to the diverting roller 13. Within the completely slid front wall 2 in the direction of the back wall 3, the connection point 12 is by contrast (additionally in the same run of the drive mechanism) positioned close to the diverting gear. Moreover, independent of the position of the slideable front wall 2, the chain section 8 is always led over the diverting gear and the cable section 11 over the diverting roller 13.

Between the drive slide 10 and the end of the chain section 8 that is connected with the drive slide 10, a tension guide 14 is integrated. This encompasses a coil spring 15, that is preloaded between the drive slide 10 and a stop element 16 that is connected with the end of the chain section 8 and thereby holds the drive mechanism 9 preloaded in place.

The drive mechanism is, with the exception of the section of drive mechanism 9 that is directly led over the diverting gear, arranged within a developed channel 17 from floor 1. This is also the case for the connection with the ends of section of the drive slide 10 serving drive mechanism 9. Channel 17 spans the cargo bay, which means that this is developed, referring to the main surface 18 of the floor, dropped upwards, whereby the integration of the drive mechanism is only locally limited by the height of the cargo bay, which means in the middle area of the (with reference to cross direction) longitudinal direction passing channel 17. Channel 17 also serves as the sideways guide of the sliding movement of the front wall 2, whereto channel 17 intervenes or is guided in a slot opening of front wall 2, and goes out from the edge of the front wall 2 from floor 1.

Figure 7:
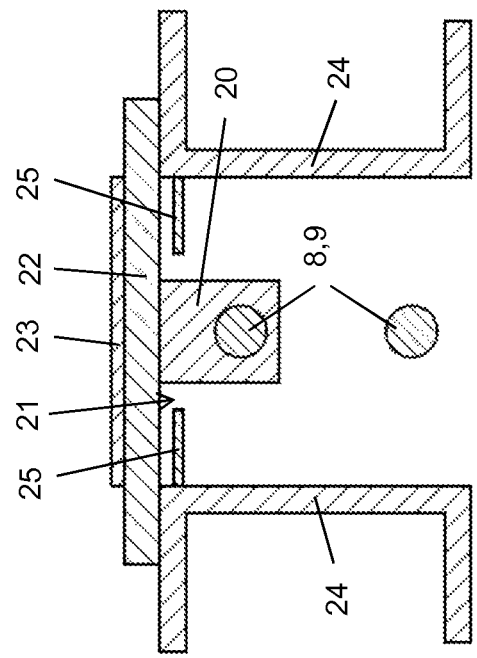
FIG. 7: a cross section through the part of the cargo bay construction represented in FIG. 5 along the cut plane VII-VII in a simplified representation.

The drive slide 10 is strongly connected with longitudinal beams 19 of a roll frame of the slideable front wall 2. For this, the mechanism serving vertical parts 20 of the drive slide 10 span the connection with the end of mechanism through a developed guide opening 21, spanning the longitudinal direction of the cargo bay construction in the upper side of channel 17. These vertical parts 20 are connected with face fit to channel 17 and overlaying cross sections 22 of the drive slide 10 are connected with the side members 19 of the roll frame (not represented in FIG. 7). A movement of the drive mechanism 9 by means of the drive motor 6 is consequently transferred to drive slide 10 on the front wall 2, whereby the front wall 2 is correspondingly shifted.

Figure 6:
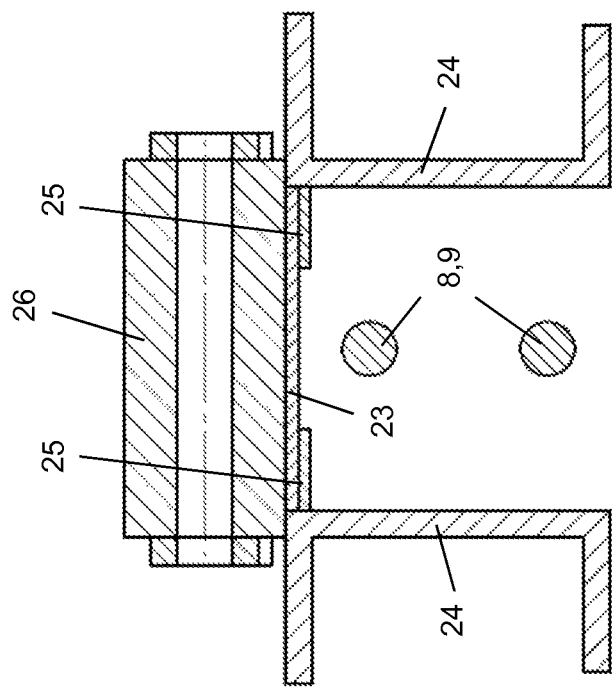
FIG. 6: a cross section through the part of the cargo bay construction represented in FIG. 5 along the cut plane VI-VI in a simplified representation.

In connection with the respective position of the front wall 2 a more or less long section of channel 17 is located within the cargo bay and the cargo stored in it is thereby exposed. In order to avoid the cargo intruding into guide opening 21, cover 23 has been implemented. For this, cover 23 is supported on the developed section of floor 1 by the upper side of channel 17. In this process, the integration of cover 23 into the upper side of channel 17 is succinctly executed in the fundamentals. This is thereby realized so that the channel 17 opening to the bottom is displaced and mounted down by two laterally limited longitudinal beams 24 to the channel inner space as well as by two on the longitudinal beams 24 (around the measure of the thickness of the cover 23), the channel inner space is developed with upward limited support 25 (compare FIG. 6).

In the area of front wall 2, cover 23 is led above the drive slide 10, whereby this is lifted locally by channel 17 because of cross sections 22 connected with the longitudinal beams 18 of the roll frame laying on the upper side of channel 17. This however always takes place below the oriented front wall 2 which is obliquely tipped forward and is therefore outside of the cargo bay, so that no intrusions are to be expected into the developed gap by the cargo either laterally or through it from the side between the upper side of channel 17 and the under side of the cover 23.

The local lifting of cover 23 through contact with the cross sections 22 of the drive slide 10 is achieved through a corresponding elastic deformability of cover 23. For this, this is developed from a sufficiently thin and thereby light elastic deformable steel sheet.

In order to ensure that the lifting of cover 23 on the area below the roll frame of the front wall 2 remains limited, two rollers 26 which are arranged on the longitudinal axis ends of the roll frame are shifted, not only on the longitudinal beams 24 of channel 17 but rather also on the corresponding sections of cover 23, whereby the cover 23 is pushed from the rollers 26 on the upper side of channel 17.

Figure 4:
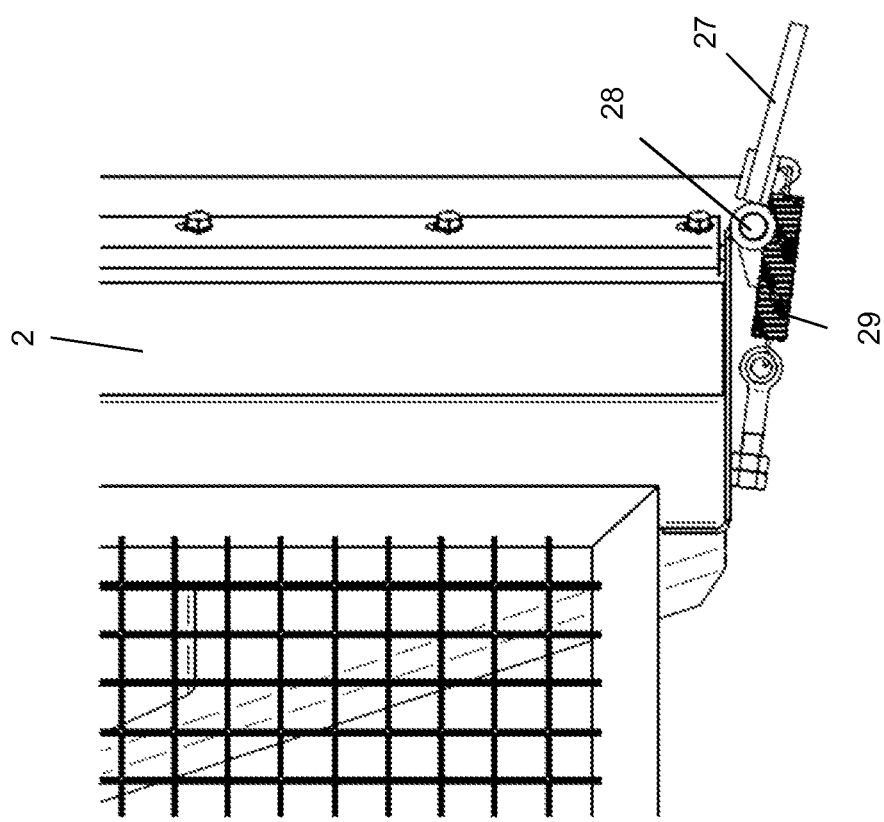
FIG. 4: the section indicated in FIG. 1 by IV in the enlarged representation.

In order to prevent the cargo from intruding, especially in the sliding of the front wall 2, the developed gaps between the front wall 2 and the side walls 5 on the one hand, and front wall 2 and the floor 1 and on the other hand, are covered by strip like seal elements 27. Seal elements 27 are able to be turned, as depicted in FIG. 4 around an axis 28 that spans in the longitudinal direction of the respective gap that is to be sealed, fixed on the front wall 2 in a rotatable manner and with their sealing edges by means of a preloaded spring element 29, and fixed against the respective side wall 5 or the floor 1. This spring-loaded, turnable storage of the sealing element 27 serves not only to compensate for a shortening due to wear of the sealing element 27, but rather also to offset the changing width of the cargo bay. The side walls 5 pass namely continually from a parallel orientation in the area of the front end of the cargo bay construction in an increasing trapezoidal orientation in the back area, to the unloading opening developed end of the cargo bay construction, whereby the width between the upper edges of the side walls 5 in comparison to the width between the lower edges of the side wall 5 gets bigger. The expansion of the cargo bay in the direction of the back end ensures, through a replacement of the cargo from the sidewalls in sliding and thereby for a relatively low requirement for shift efficiency.

Figure 8:
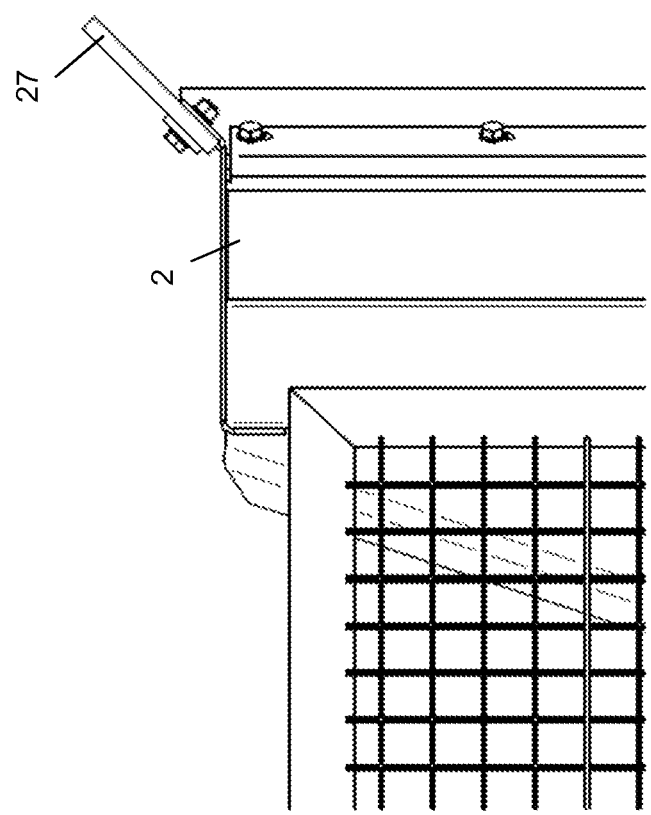
FIG. 8: an alternative design of a seal for the moveable front wall of the cargo bay construction according to FIGS. 1 to 7.

FIG. 8 shows an alternative design for the sealing of the developed gap between the front wall 2 on the one hand and the side walls 5, as well as the floor 1 on the other. With this design, the strip-like seal elements 27 are developed to be fixed. An expansion of the cargo bay over the length of the cargo bay construction can compensate therefore for the difference in strength of the deformation of the seal elements 27.

REFERENCE SYMBOL LIST

1. Floor
2. Front wall
3. Back wall
4. Swivel joint
5. Side wall
6. Drive motor
7. Driven shaft
8. Chain section
9. Drive mechanism
10. Drive slides
11. Rope section
12. Joint
13. Guide pulley
14. Clamping device
15. Coil spring
16. Stop element
17. Channel
18. Main surface of the floor
19. Longitudinal beams of the roller
20. Vertical part of the drive section
21. Guide opening
22. Cross part of the drive slide
23. Cover
24. Longitudinal beams of the channel
25. Support beams
26. Pulley
27. Sealing element
28. Axis
29. Spring element

The invention claimed is:

1. A cargo bay construction comprises:
a floor and a wall that is slideable along the floor, whereby, below the wall facing surfaces of the floor, a drive slide is arranged, said drive slide being slideable along the floor and being connected to the wall by a connecting element extending through a guide opening in the floor, characterized in that the guide opening is covered by an elastic deformable cover overlying the floor, whereby the cover in the area of the drive slide is lifted from the floor under elastic deformation by the connecting element, wherein the drive slide is arranged within a channel spanning the cargo bay and developed within the floor, and wherein the channel intervenes in a slot opening of the slideable wall.

2. The cargo bay construction according to claim 1, characterized in that the cover is made from sheet steel.

3. The cargo bay construction according to claim 1, characterized in that the cover as a result of contact with the drive slide, is lifted from the floor.

4. The cargo bay construction according to claim 1, characterized in that the drive slide is arranged outside of a floor surface of a cargo bay, which is limited by the slideable wall.

5. The cargo bay construction according to claim 4, characterized in that the drive slide is connected at two ends to the drive mechanism and at least one of the end is given a tension guide.

6. The cargo bay construction according to claim 1, characterized in that the drive slide is integrated into a drive mechanism.

7. The cargo bay construction according to claim 6, characterized in that the drive mechanism encompasses a drive motor which is statically integrated into the cargo bay construction.

8. The cargo bay construction according to claim 7, characterized in that the drive mechanism includes a chain section and a cable section, and the chain section is driven by the drive motor.

9. The cargo bay construction according to claim 8, characterized in that the chain section is guided by a diverting gear of the drive mechanism and the cable section is guided over a diverting roller of the drive mechanism.

10. The cargo bay construction according to claim 1, characterized in that the slideable wall is supported by a roller, which is spaced in the direction of movement from the drive slide and rolls on the cover.

11. The cargo bay construction according to claim 10, characterized in that the roller is arranged between the drive slide and the cargo bay limited by the slideable wall.

12. A vehicle with a carriage and a cargo bay construction arranged on the carriage according to claim 1.

13. A cargo bay construction comprises:
a floor,
a wall slideable along the floor,
a guide opening in the floor,
a drive slide having a drive connection member and a cross member, said drive connection member extending from below said guide opening to said cross member, and said cross member being positioned above and spanning said guide opening and connecting said drive slide to said wall, said drive slide being slideable along the floor by a drive mechanism interacting with said drive connection member, characterized in that said guide opening is covered by an elastic deformable cover, whereby the cover in the area of the drive slide is lifted from the floor under elastic deformation by the cross member, wherein said wall includes a roll frame having first and second rollers positioned above and spanning said guide opening, and said cross member is connected to said roll frame, said first and second rollers of said roll frame pushing said deformable cover downwardly over the guide opening in front and in back of the said cross member such that said deformable cover is lifted from the floor only in an area between said first and second rollers.

* * * * *